(12) United States Patent
Choi

(10) Patent No.: US 8,620,091 B2
(45) Date of Patent: Dec. 31, 2013

(54) METHOD AND APPARATUS FOR DETECTING SPECIFIC EXTERNAL HUMAN BODY PARTS FROM TEXTURE ENERGY MAPS OF IMAGES BY PERFORMING CONVOLUTION

(75) Inventor: Byeong Cheol Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 712 days.

(21) Appl. No.: 12/785,806

(22) Filed: May 24, 2010

(65) Prior Publication Data
US 2011/0123076 A1  May 26, 2011

(30) Foreign Application Priority Data
Nov. 23, 2009  (KR) .................... 10-2009-0113467

(51) Int. Cl.
*G06K 9/62* (2006.01)
*G06K 9/00* (2006.01)

(52) U.S. Cl.
USPC .......................................... 382/209; 382/103

(58) Field of Classification Search
USPC ......................................................... 382/209
See application file for complete search history.

(56) References Cited

U.S. PATENT DOCUMENTS

| 6,792,135 B1 * | 9/2004 | Toyama ......................... 382/118 |
| 6,973,201 B1 | 12/2005 | Colmenarez et al. |
| 7,017,816 B2 * | 3/2006 | Yen et al. .................. 235/462.25 |
| 7,274,832 B2 * | 9/2007 | Nicponski ..................... 382/297 |
| 2006/0222243 A1 * | 10/2006 | Newell et al. ................. 382/173 |
| 2007/0016576 A1 | 1/2007 | Jeong et al. |
| 2008/0004505 A1 * | 1/2008 | Kapit et al. .................... 600/300 |
| 2008/0159624 A1 * | 7/2008 | Sathish et al. ................ 382/170 |
| 2008/0267443 A1 * | 10/2008 | Aarabi ........................... 382/100 |
| 2009/0265287 A1 * | 10/2009 | Haas ................................ 706/3 |
| 2011/0025608 A1 * | 2/2011 | Kruglick ....................... 345/173 |

FOREIGN PATENT DOCUMENTS

| JP | 2008-185480 A | 8/2008 |
| KR | 10-2005-0114817 A | 12/2005 |
| KR | 10-0616229 A | 8/2006 |
| KR | 10-2007-0008210 A | 1/2007 |
| KR | 10-2008-0043080 A | 5/2008 |
| KR | 10-2008-0079443 A | 9/2008 |

OTHER PUBLICATIONS

Jarc et al., Texture features for affine registration of thermal (FLIR) and visible images, Computer Vision Workshop, Feb. 2007, pp. 1-7.*

(Continued)

*Primary Examiner* — David Zarka
(74) *Attorney, Agent, or Firm* — Kile Park Reed & Houtteman PLLC

(57) ABSTRACT

An apparatus for detecting specific human body parts in an image includes: a texture energy analysis unit for analyzing energy distribution in the image and generating texture energy maps; a candidate region-of-interest extraction unit for extracting candidate regions-of-interest for the specific body parts on a given texture energy map by applying a threshold to the given texture energy map, the given texture energy map being selected among the texture energy maps; a candidate mask application unit for performing convolution between candidate masks for the specific body parts and the candidate regions-of-interest and selecting candidate body parts based on results of the convolution; and a body part detection unit for detecting the specific body parts on the image by performing verification on the candidate body parts. The verification is performed by using machine-learning models for the specific body parts.

16 Claims, 7 Drawing Sheets

(56) References Cited

OTHER PUBLICATIONS

Choi et al., Adult image detection with c lose-up face classification, In Consumer Electronics, 2009. ICCE'09. Digest of Technical Papers International Conference on, pp. 1-2. IEEE, 2009.*

Choi et al., Human body parts candidate segmentation using Laws texture energy measures with skin color, In Advanced Communication Technology (ICACT), 2011 13th International Conference on, pp. 556-560. IEEE, 2011.*

Suzuki et al., A solid texture analysis based on three-dimensional convolution kernels, Electronic Imaging 2007, Videometrics IX,(EI-2007), Proc. of SPIE and IST Electronic Imaging, SPIE vol. 6491, 64910W, pp. 1-8, Jan. 2007.*

Suzuki et al., A texture energy measurement technique for 3D volumetric data, In Systems, Man and Cybernetics, 2009. SMC 2009. IEEE International Conference on, pp. 3779-3785, IEEE, Oct. 2009.*

Laws' Texture Measures, pp. 1-3, available at http://www.ccs3.lanl.gov/~kelly/ZTRANSITION/notebook/laws.shtml.*

* cited by examiner

FIG.2

TEXTURE MEASURES (1×5 BASIC MATRIX)

L5=[1, 4, 6, 4, 1]
E5=[-1, -2, 0, 2, 1]
S5=[-1, 0, 2, 0, -1]
R5=[1, -4, 6, -4, 1]
W5=[-1, 2, 0, -2, 1]

TEXTURE MEASURES (5×5 COMBINED MATRIX)

L5E5=L5'*E5
E5L5=E5'*L5
L5R5=L5'*R5
R5L5=R5'*L5
E5S5=E5'*S5
S5E5=S5'*E5
S5S5=S5'*S5
R5R5=R5'*R5
L5S5=L5'*S5
S5L5=S5'*L5
E5E5=E5'*E5
E5R5=E5'*R5
R5E5=R5'*E5
S5R5=S5'*R5
R5S5=R5'*S5

METHOD AND APPARATUS FOR DETECTING SPECIFIC EXTERNAL HUMAN BODY PARTS FROM TEXTURE ENERGY MAPS OF IMAGES BY PERFORMING CONVOLUTION

CROSS-REFERENCE(S) TO RELATED APPLICATION(S)

The present invention claims priority to Korean Patent Application No. 10-2009-0113467, filed on Nov. 23, 2009, which is incorporated herein by reference.

FIELD OF THE INVENTION

The present invention relates to a region-of-interest detection technique; and more particularly, to a method and apparatus for detecting specific human body parts in an image, the specific human body parts arousing sexuality.

BACKGROUND OF THE INVENTION

Adult image identification techniques can be used in various fields, e.g., medical image analysis, Internet-based multimedia services, multimedia contents broadcasting and privacy protection.

However, since the adult image identification techniques being used or being developed classify an image into an adult image by estimating overall sexuality or provocativeness of the image without detecting regions-of-interest in the image, they have limitations in actual applications to various services.

SUMMARY OF THE INVENTION

In view of the above, the present invention provides a method and apparatus for detecting specific human body parts in an image, the specific human body parts arousing sexuality, wherein candidate body parts on a texture energy map of the image are found by using candidate masks and thus found candidate body parts are verified by using machine-learning body part models so that existence of the specific body parts on the image can be accurately detected.

In accordance with an aspect of the present invention, there is provided an apparatus for detecting specific human body parts in an image, the apparatus including:

a texture energy analysis unit for analyzing energy distribution in the image and generating texture energy maps;

a candidate region-of-interest extraction unit for extracting candidate regions-of-interest for the specific body parts on a given texture energy map by applying a threshold to the given texture energy map, the given texture energy map being selected among the texture energy maps;

a candidate mask application unit for performing convolution between candidate masks for the specific body parts and the candidate regions-of-interest and selecting candidate body parts based on results of the convolution; and a body part detection unit for detecting the specific body parts on the image by performing verification using machine-learning models for the specific body parts on the candidate body parts.

Preferably, the texture energy analysis unit analyzes the energy distribution by using texture energy measures.

Preferably, the texture energy measures are texture energy measures of combined matrixes generated by using texture energy measures of basic matrixes.

Preferably, the texture energy maps are generated via convolution between the texture energy measures of combined matrixes and the image on a macro window basis.

Preferably, the candidate region-of-interest extraction unit selects the given texture energy map based on weights assigned to a texture energy measure used in generating the given energy map, the weights being specialized for the specific body parts.

Preferably, the threshold is calculated based on minimum and maximum energy values on a quantized texture energy map generated by quantizing the given texture energy map by an intensity indexing.

Preferably, the candidate masks include at least one candidate face mask, at least one candidate breast mask, at least one candidate genitals mask and at least one combination of two or more of said at least one candidate face mask, said at least one candidate breast mask and said at least one candidate genitals mask.

Preferably, said at least one candidate face mask and said at least one genitals mask are configured to be used in eight-directional masking, and said at least one breast mask is configured to be used in nine-directional masking.

The apparatus may further include a normalization unit for performing a normalization process on the candidate regions-of-interest extracted by the candidate region-of-interest and then providing the candidate regions-of-interest having been normalized to the candidate mask application unit.

Preferably, the normalization process includes splitting and resizing of the candidate regions-of-interest.

The apparatus may further include an analysis result database for storing therein body parts detection result of the body part detection unit.

Preferably, the body parts detection result includes a texture energy map on which locations and names of the specific body parts are denoted.

In accordance with another aspect of the present invention, there is provided a method for detecting specific human body parts in an image, the method including:

generating a texture energy map by analyzing texture energy distribution of the image;

extracting candidate regions-of-interest for the specific body parts on the texture energy map, the candidate regions-of-interest having energy values equal to or higher than a threshold;

performing convolution between candidate masks for the specific body parts and the candidate regions-of-interest to select candidate body parts based on results of the convolution; and detecting the specific body parts on the image by performing verification using machine-learning models for the specific body parts on the candidate body parts.

Preferably, said generating the texture energy map includes generating texture energy measures of combined matrixes by using texture energy measures of basic matrixes; and generating the texture energy map by performing convolution between the texture energy measures of combined matrixes and the image on a macro window basis.

Preferably, said extracting the candidate regions-of-interest includes generating a quantized texture energy map by quantizing the texture energy map by an intensity indexing; and calculating the threshold based on minimum and maximum energy values on the quantized texture energy map.

The method may further include normalizing the candidate regions-of-interest before said performing the convolution between the candidate masks and the candidate regions-of-interest.

The method may further include generating, after said detecting the specific body parts, body parts detection result including a texture energy map on which locations and names of the specific body parts are denoted.

Preferably, the candidate masks include at least one candidate face mask, at least one candidate breast mask, at least one candidate genitals mask and at least one combination of two or more of said at least one candidate face mask, said at least one candidate breast mask and said at least one candidate genitals mask.

Preferably, said at least one candidate face mask and said at least one genitals mask are configured to be used in eight-directional masking, and said at least one breast mask is configured to be used in nine-directional masking.

Preferably, said normalizing the candidate regions-of-interest includes splitting and resizing of the candidate regions-of-interest.

According to the present invention, candidate body parts arousing sexuality are found by using candidate masks and thus found candidate body parts are verified by using machine-learning body part models. Therefore, existence of specific body parts on an image can be accurately detected.

BRIEF DESCRIPTION OF THE DRAWINGS

The above and other objects and features of the present invention will become apparent from the following description of embodiments, given in conjunction with the accompanying drawings, in which:

FIG. 2 illustrates an exemplary view of texture energy measures for use in generating text energy maps by the texture energy analysis unit of FIG. 1;

DETAILED DESCRIPTION OF THE EMBODIMENTS

Hereinafter, embodiments of the present invention will be described in detail with reference to the accompanying drawings, which form a part hereof.

Figure 1:
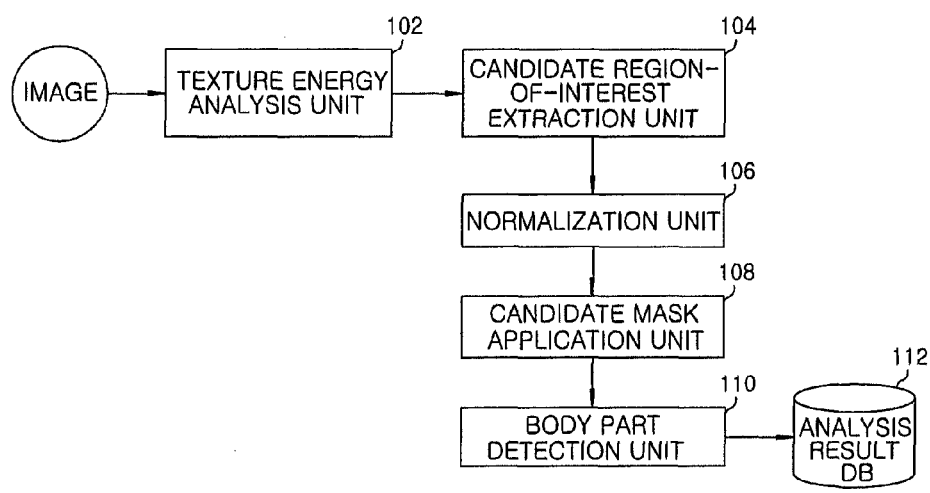
FIG. 1 illustrates a block diagram of an apparatus for detecting regions-of-interest in a human body image in accordance with an embodiment of the present invention.

FIG. 1 illustrates a block diagram of an apparatus for detecting regions-of-interest in a human body image in accordance with an embodiment of the present invention.

The apparatus includes a texture energy analysis unit 102, a candidate region-of-interest extraction unit 104, a normalization unit 106, a candidate mask application unit 108, a body part detection unit 110 and an analysis result database (DB) 112.

The texture energy analysis unit 102 analyzes texture energy of an original image to generate texture energy maps.

Figure 3:
FIG. 3 illustrates an exemplary view of texture energy maps generated by using the texture energy measures of FIG. 2.

For example, the texture energy analysis unit 102 measures energy distribution for each pixel on the original image by using fifteen 5×5 texture energy measures shown in FIG. 2 and generates texture energy maps shown in FIG. 3.

In FIG. 2, five left-side elements L5, E5, S5, R5 and W5 represent texture energy measures of 1×5 basic matrixes, and fifteen right-side elements L5E5, E5L5, L5R5, R5L5, E5S5, S5E5, S5S5, R5R5, L5S5, S5L5, E5E5, E5R5, R5E5, S5R5 and R5S5 represent texture energy measures of 5×5 combined matrixes. Here, L, E, S, R and W indicate a locality component, an edge component, a spot component, a ripple component and a wave component, respectively. Further, numbers in square brackets of each component represent weights to be multiplied with pixel values. Due to the similarity in properties of the ripple component R and the wave component W, only one of them may be used for generating fifteen 5×5 texture energy measures. In FIG. 2, the locality component L, the edge component E, the spot component S and the ripple component R are used in generating the 5×5 texture energy measures.

The texture energy analysis unit 102 generates fifteen 5×5 texture energy measures by using four 1×5 texture energy measures, and then generates the texture energy maps as shown in FIG. 3 via convolution between the fifteen 5×5 texture energy measures and the original image on a 15×15 macro window basis.

The candidate region-of-interest extraction unit 104 extracts candidate regions-of-interest for specific body parts by applying a threshold to a texture energy map generated using a given measure, e.g., R5E5 of FIG. 3, among the texture energy maps generated by the texture energy analysis unit 102. Here, the given measure can be selected based on weights assigned to the given measure, the weights being specialized for specific body parts. For example, R5E5 of FIG. 3 is a measure having a weight specialized for a face.

Figure 4:
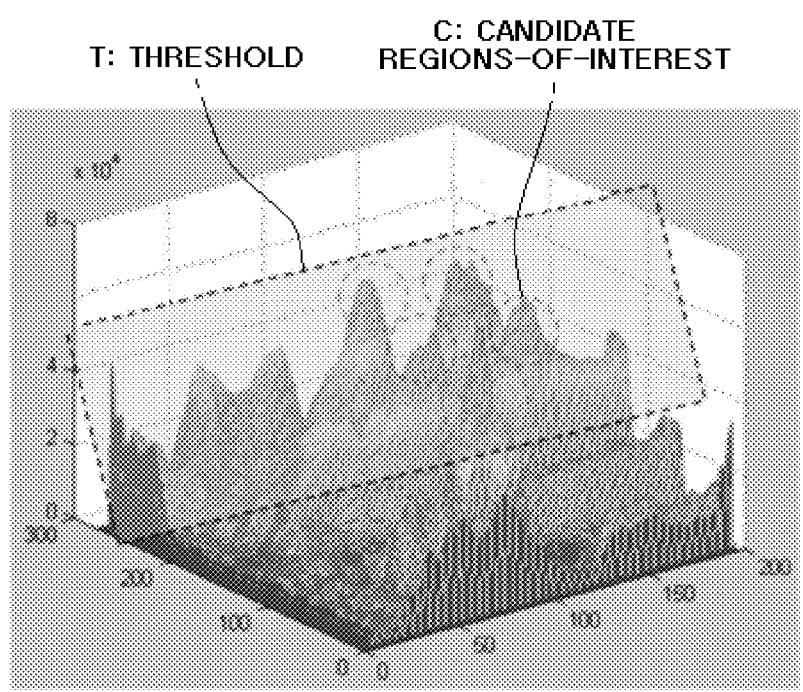
FIG. 4 illustrates an exemplary view for explaining candidate regions-of-interest extraction procedure performed by the candidate region-of-interest extraction unit of FIG. 1.

FIG. 4 illustrates an exemplary view for explaining candidate regions-of-interest extraction procedure performed by the candidate region-of-interest extraction unit 104 of FIG. 1. In FIG. 4, candidate regions-of-interest C are extracted by using a threshold T.

The threshold T is calculated as in Equation 1:

$$T = E_{min} + \frac{E_{max} - E_{min}}{2} = \frac{E_{max} + E_{min}}{2}, \quad \text{Equation 1}$$

wherein $E_{min}$, and $E_{max}$ respectively denote minimum and maximum energy values on a texture energy map quantized by 16-level or 32 level intensity indexing. The candidate regions-of-interest C are regions having energy values equal to or higher than the threshold T.

The normalization unit 106 performs a normalization process on the candidate regions-of-interest extracted by the candidate region-of-interest extraction unit 104. To be specific, the normalization unit 106 splits and resizes the candidate regions-of-interest. Through the normalization process performed by the normalization unit 106, normalized candidate regions-of-interest for specific body parts can be obtained.

The candidate mask application unit 108 performs convolution between candidate masks for specific body parts and the candidate regions-of-interest having been subjected to the normalization process and then selects, for each body part, a candidate region-of-interest having the highest convolution result as a candidate body part.

The body part detection unit 110 detects specific body parts by performing verification using machine-learning body part models on the candidate body parts selected by the candidate mask application unit 108.

Figure 5:
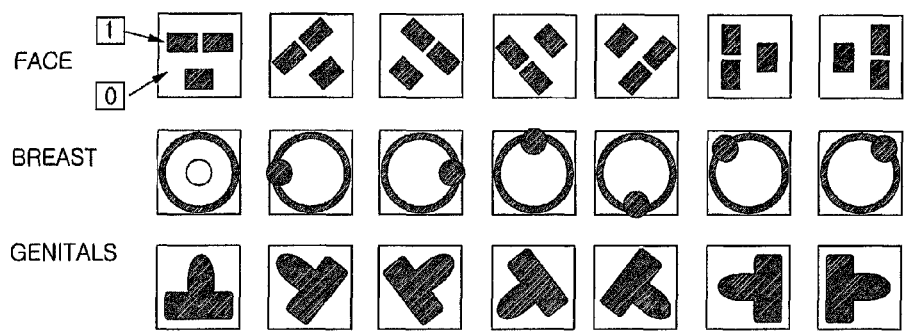
FIG. 5 illustrates an exemplary view of candidate masks for body parts for use in selecting candidate body parts by the candidate mask application unit of FIG. 1.

FIG. 5 illustrates an exemplary view of candidate masks for body parts for use in selecting candidate body parts by the candidate mask application unit of FIG. 1.

As shown in FIG. 5, the candidate masks may include candidate face masks, candidate breast masks and candidate genitals masks. In FIG. 5, the candidate face masks and the candidate genitals masks are configured to be used in eight-directional masking, while the candidate genitals masks are configured to be used in nine-directional masking. The candidate genitals masks may include candidate masks for female genitals, male genitals and combined genitals. Further, two or more candidate masks can be combined to detect various scenes. For example, combination of the candidate face masks and the candidate genitals masks may be used to detect an oral sex scene.

Each of the candidate masks for specific body parts may have a size of 32×32 pixels. Also, the size can vary depending on analysis environment.

The analysis result DB 112 stores therein body parts detection result data, i.e., processing results of the body part detection unit 110.

Figure 6:
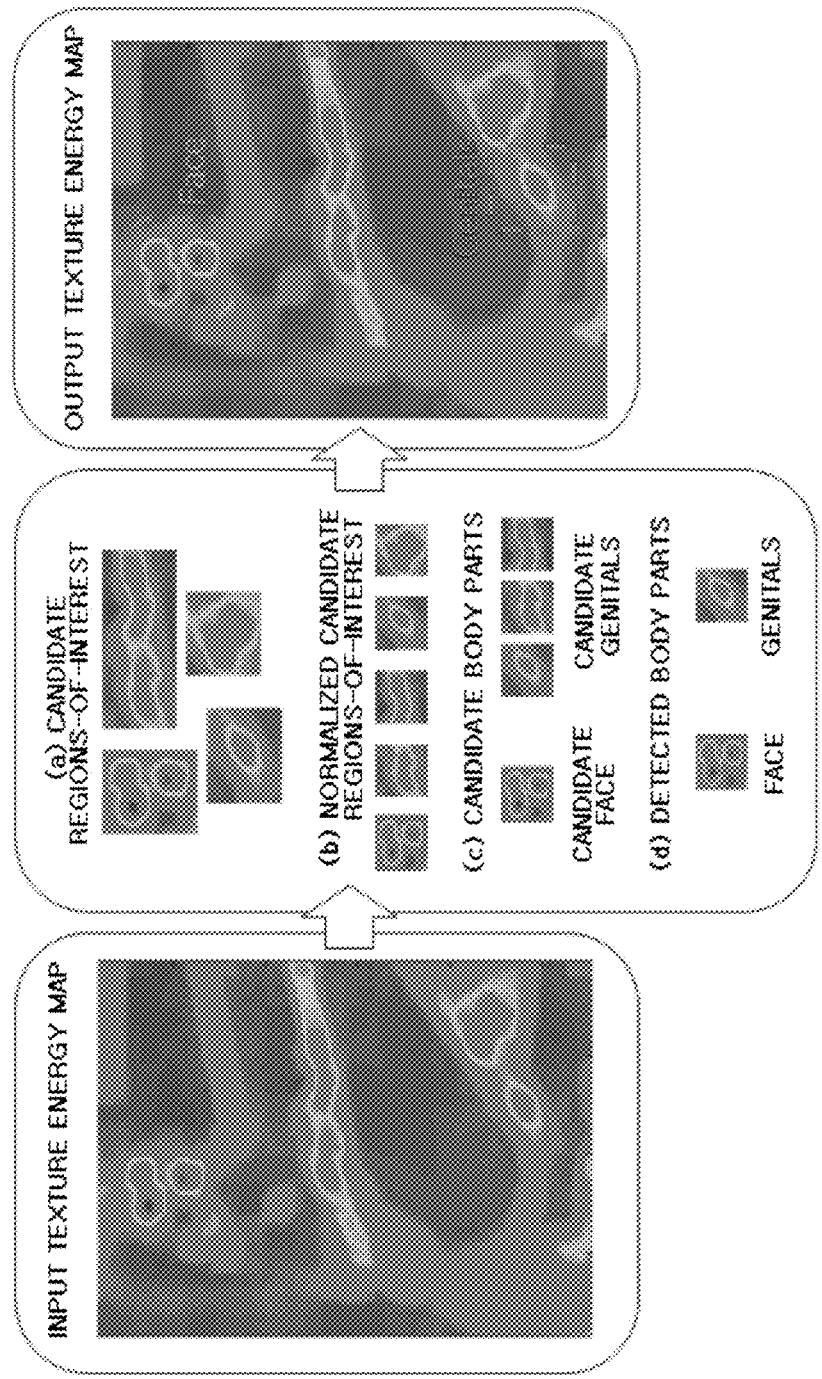
FIG. 6 illustrates an exemplary view for explaining procedures through which body part detection result data is obtained from the texture energy map generated by the texture energy analysis unit.

FIG. 6 illustrates an exemplary view for explaining procedures through which the body part detection result data is obtained from the texture energy map generated by the texture energy analysis unit 102. As shown in FIG. 6, the body parts detection result data may be a texture energy map on which locations and names of the detected specific body parts are denoted.

Hereinafter, a method for detecting regions-of-interest in a human body image in accordance with an embodiment of the present invention will be described with reference to FIGS. 1 to 7.

Figure 7:
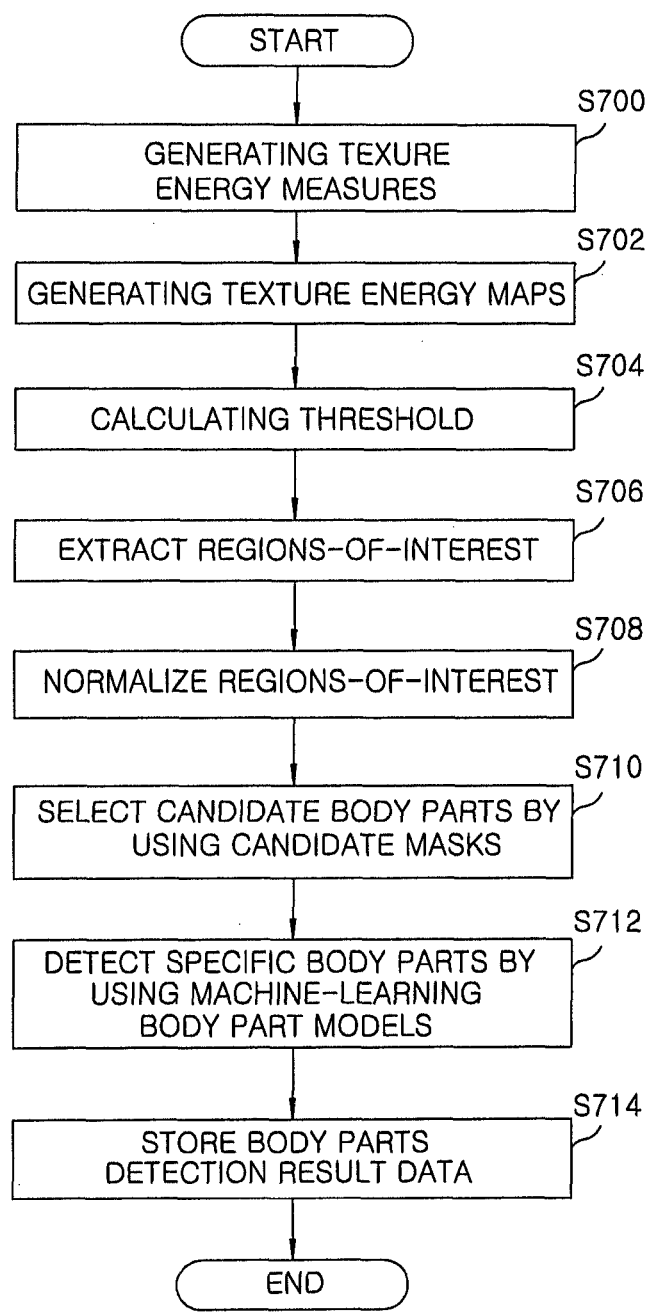
FIG. 7 illustrates a flowchart of a method for detecting regions-of-interest in a human body image in accordance with an embodiment of the present invention.

FIG. 7 illustrates a flowchart of a method for detecting regions-of-interest in a human body image in accordance with an embodiment of the present invention.

The texture energy analysis unit 102 generates fifteen texture energy measures of 5×5 combined matrixes by using four texture energy measures of 1×5 combined matrixes, the texture energy measures being as shown in FIG. 2 (step S700).

The texture energy analysis unit 102 generates texture energy maps via convolution between the fifteen texture energy measures generated in the step S700 and an original image on a 15×15 macro window basis (step S702).

The candidate region-of-interest extraction unit 104 calculates a threshold by using a minimum energy value and a maximum energy value on a given texture energy map among the texture energy maps generated in the step S702 (step S704). Here, the given texture energy map may be selected based on weights specialized for specific body parts. The threshold may be calculated as in Equation 1.

The candidate region-of-interest extraction unit 104 extracts regions-of-interest by using the threshold calculated in the step S704 (step S706). To be specific, the candidate region-of-interest extraction unit 104 may extract as the regions-of-interest regions having an energy value equal to or higher than the threshold, as shown in FIG. 4.

The normalization unit 106 performs a normalization process on the candidate regions-of-interest extracted in the step S706 (step S708). The normalization process may include splitting and resizing of the candidate regions-of-interest.

The candidate mask application unit 108 performs convolution between candidate masks for specific body parts and the candidate regions-of-interest normalized in the step S708 and then selects candidate body parts (step S710). The candidate masks may be as shown in FIG. 5. The candidate mask application unit 108 may select, for each body part, a candidate region-of-interest having the highest convolution result as a candidate body part.

The body part detection unit 110 performs verification using machine-learning body part models on the candidate regions-of-interest selected in the step S710 to detect specific body parts on the original image (step S712).

Body parts detection result data verified by the body part detection unit 110 in the step S712 is stored in the analysis DB 112 (step S714). As shown in FIG. 6, the body part detection result data may be a texture energy map on which locations and names of the detected body parts are denoted.

While the invention has been shown and described with respect to the particular embodiments, it will be understood by those skilled in the art that various changes and modification may be made.

What is claimed is:

1. An apparatus for detecting one or more specific external human body parts in an image, the apparatus comprising:
   a processor; and
   a memory comprising code that, when executed by the processor, causes the processor to:
   analyze energy distribution in the image and generate texture energy maps;
   extract those regions having energy values higher than or equal to a threshold from a given texture energy map as one or more candidate regions-of-interest, the given texture energy map being selected from among the texture energy maps;
   perform convolution between one or more candidate masks for the one or more specific external human body parts and the one or more candidate regions-of-interest, and select one or more candidate external human body parts based on one or more results of the convolution; and
   detect the one or more specific external human body parts in the image by performing verification using one or more machine-learning models for the one or more specific external human body parts on the one or more candidate external human body parts,
   wherein the one or more specific external human body parts comprise at least one of a breast or genitals,
   wherein the one or more candidate masks comprise at least one candidate face mask, at least one candidate breast mask, at least one candidate genitals mask, or at least one combination of two or more of said at least one candidate face mask, said at least one candidate breast mask, and said at least one candidate genitals mask, and
   wherein said at least one candidate face mask and said at least one candidate genitals mask are configured to be used in eight-directional masking, and said at least one candidate breast mask is configured to be used in nine-directional masking.

2. The apparatus of claim 1, wherein the code, when executed by the processor, causes the processor to analyze the energy distribution by using texture energy measures.

3. The apparatus of claim 2, wherein the texture energy measures are texture energy measures of combined matrixes generated by using texture energy measures of basic matrixes.

4. The apparatus of claim 3, wherein the texture energy maps are generated via convolution between the texture energy measures of combined matrixes and the image on a macro window basis.

5. The apparatus of claim 1, wherein the code, when executed by the processor, causes the processor to select the given texture energy map based on weights assigned to a texture energy measure used in generating the given texture energy map, the weights being specialized for the one or more specific external human body parts.

6. The apparatus of claim 5, wherein the threshold is calculated based on minimum and maximum energy values on a quantized texture energy map generated by quantizing the given texture energy map by an intensity indexing.

7. The apparatus of claim 1, wherein the code, when executed by the processor, causes the processor to:
perform a normalization process on the extracted one or more candidate regions-of-interest.

8. The apparatus of claim 7, wherein the normalization process comprises splitting and resizing of the extracted one or more candidate regions-of-interest.

9. The apparatus of claim 1, further comprising:
an analysis result database configured to store therein an external human body parts detection result of the processor.

10. The apparatus of claim 9, wherein the external human body parts detection result comprises a texture energy map on which one or more locations and one or more names of the one or more specific external human body parts are denoted.

11. A method for detecting one or more specific external human body parts in an image, the method comprising:
generating a texture energy map by analyzing texture energy distribution of the image;
extracting those regions having energy values higher than or equal to a threshold from the texture energy map as one or more candidate regions-of-interest;
performing convolution between one or more candidate masks for the one or more specific external human body parts and the one or more candidate regions-of-interest to select one or more candidate external human body parts based on one or more results of the convolution; and
detecting the one or more specific external human body parts in the image by performing verification using one or more machine-learning models for the one or more specific external human body parts on the one or more candidate external human body parts,
wherein the one or more specific external human body parts comprise at least one of a breast or genitals,
wherein the one or more candidate masks comprise at least one candidate face mask, at least one candidate breast mask, at least one candidate genitals mask, or at least one combination of two or more of said at least one candidate face mask, said at least one candidate breast mask, and said at least one candidate genitals mask, and
wherein said at least one candidate face mask and said at least one candidate genitals mask are configured to be used in eight-directional masking, and said at least one candidate breast mask is configured to be used in nine-directional masking.

12. The method of claim 11, wherein the generating the texture energy map comprises:
generating texture energy measures of combined matrixes by using texture energy measures of basic matrixes; and
generating the texture energy map by performing convolution between the texture energy measures of combined matrixes and the image on a macro window basis.

13. The method of claim 11, wherein the extracting the one or more candidate regions-of-interest comprises:
generating a quantized texture energy map by quantizing the texture energy map by an intensity indexing; and
calculating the threshold based on minimum and maximum energy values on the quantized texture energy map.

14. The method of claim 11, further comprising:
normalizing the one or more candidate regions-of-interest before the performing the convolution between the one or more candidate masks and the one or more candidate regions-of-interest.

15. The method of claim 14, wherein the normalizing the one or more candidate regions-of-interest comprises splitting and resizing of the one or more candidate regions-of-interest.

16. The method of claim 11, further comprising:
generating, after the detecting the one or more specific external human body parts, an external human body parts detection result comprising a texture energy map on which one or more locations and one or more names of the one or more specific external human body parts are denoted.

* * * * *